Jan. 9, 1951   O. M. GAHAGAN   2,537,403
COMBINATION BREAKOUT AND SPINNING IN APPARATUS
HAVING AN AXIALLY ENGAGEABLE FRICTION CLUTCH
Filed Dec. 22, 1947   2 Sheets-Sheet 1

Inventor
Orren M. Gahagan
By Fishburn & Mullendore
Attorneys

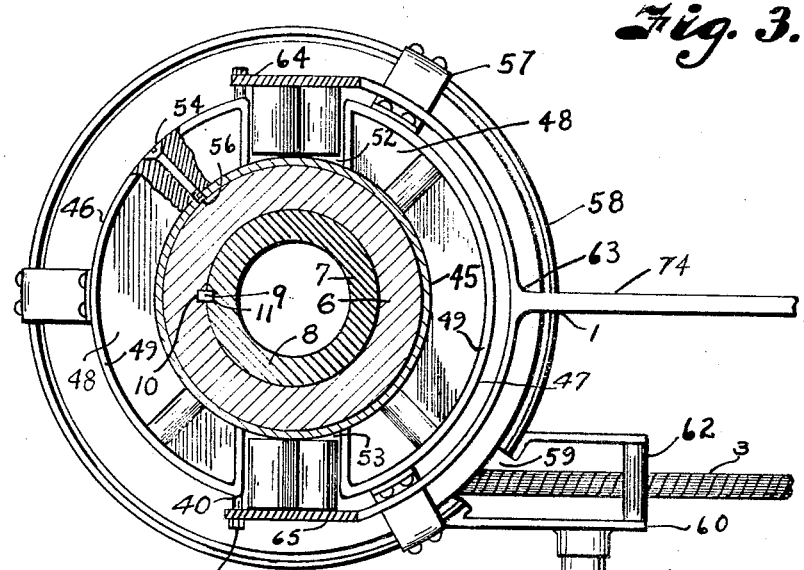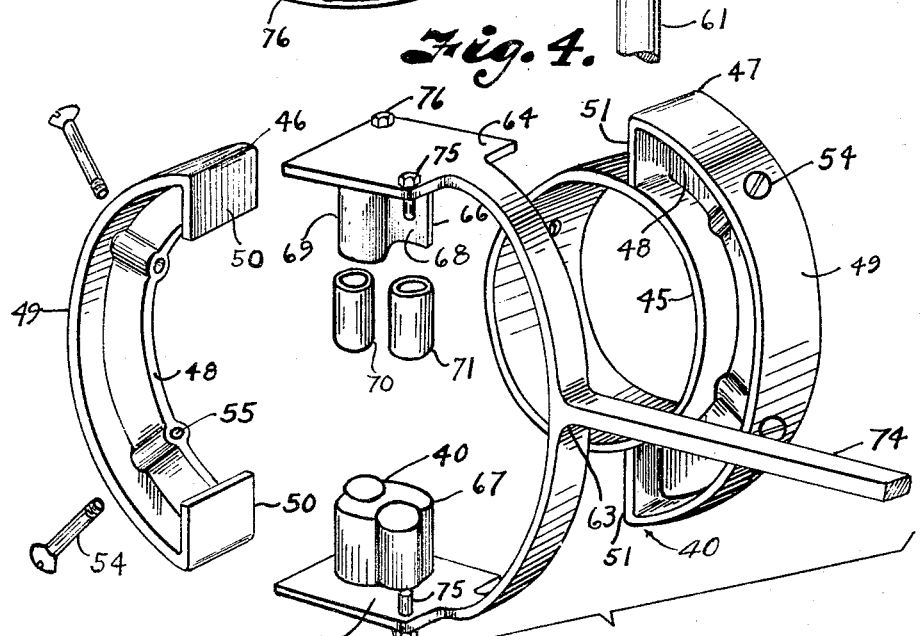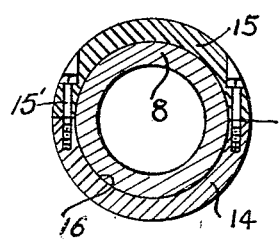

Patented Jan. 9, 1951

2,537,403

UNITED STATES PATENT OFFICE 2,537,403

COMBINATION BREAKOUT AND SPINNING IN APPARATUS HAVING AN AXIALLY ENGAGEABLE FRICTION CLUTCH

Orren M. Gahagan, Dallas, Tex.

Application December 22, 1947, Serial No. 793,282

12 Claims. (Cl. 254—185)

This invention relates to an apparatus for applying power to the cable used in effecting connection and disconnection of threaded joints in rotary drilling operations as when running the drill pipe into and out of a bore hole, and has for its principal object to provide a simple, quick-acting apparatus that is of compact and durable construction and which is positive in operation.

It is also an object of the invention to provide a power applying apparatus that may be operated by manual, air or fluid pressure for breaking out, spinning in, and setting up of threaded joints.

In accomplishing these and other objects of the invention hereinafter pointed out, I have provided improved structure, the preferred form of which is illustrated in the accompanying drawings wherein:

Fig. 3 is a cross section on the line 3—3 of Fig. 2.

Fig. 4 is a perspective view of the parts of the camming mechanism shown in disassembled spaced relation to better illustrate the construction thereof.

Fig. 5 is a detail section through the line shaft extension and taken on the line 5—5 of Fig. 2.

Figure 1:
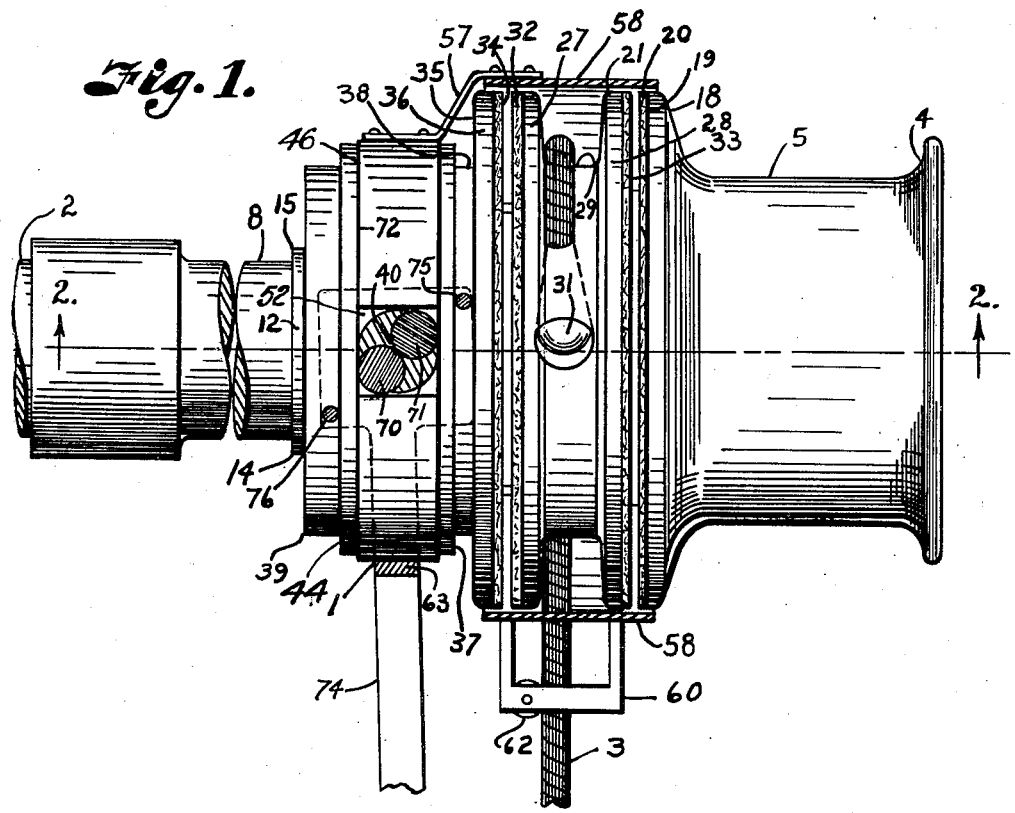
Fig. 1 is a plan view of an apparatus for applying line shaft power to the cable used in manipulation of the thread joints.

Referring more in detail to the drawings:

1 designates an apparatus constructed in accordance with the present invention and which is adapted for application to the line shaft 2 of a drawworks used in a rotary drilling rig and adapted for applying power to a cable 3, the cable 3 being adapted for spinning in threaded joints or for connection with wrenches or tongs employed in making up or breaking out of threaded joints incidental to well drilling practices.

In the illustrated instance the apparatus includes a driving member 4 in the form of a cathead or winding drum 5 having a hub 6 which may be integral therewith. The hub 6 has a bore 7 to pass over an extension 8 of the line shaft 2, the hub being rotatably connected with the drive shaft extension by means of a key 9 engaged in registering grooves 10 and 11 in the hub and line shaft extension respectively, and is retained from longitudinal movement on the line shaft extension by a collar 12 and a jam nut 13. The collar 12 is composed of mating sections 14 and 15 which fit within a groove 16 extending circumferentially of the line shaft extension, the sections 14 and 15 being preferably interconnected by bolts 15'. The nut 13 is threaded onto a terminal 17 of the shaft extension to cooperate with the split collar in clamping the hub therebetween.

The driving member 4 is provided on the cathead of the hub with a radial circumferential flange 18 having an annular face 19 supporting a ring 20 formed of friction material to cooperate in clutching a driven member 21. The driven member 21 has an annular hub portion 22 that is rotatably and slidably mounted on an antifriction bearing 23 which operates on the hub of the driving member and is retained in fixed position by an annular stop shoulder 24 on one side and keys 25 and 26 on the other. The driven member is also provided with radial spaced circumferential flanges 27 and 28 to cooperate with the hub portion 22 in forming an annular groove 29. The driven member is thus in the form of a sheave to wind the operating cable 3 which has one end suitably attached thereto as indicated at 31 in Fig. 1. The outer side faces of the radial flanges 27 and 28 are also preferably faced by rings 32 and 33 formed of friction material to cooperate with the friction ring 20 and a similar friction ring 34 on a driving pressure ring or plate 35. The driving pressure ring 35 cooperates with the driving member 4 to actuate the driven member and is slidably mounted on the hub for movement to and from driving engagement with the driven member and is rotatably connected with the hub by means of the keys 25 and 26 previously mentioned. The driving pressure ring 35 has an annular radial flange 36 which carries the friction ring 34 on one side and which cooperates on the other side with an annular flange 37 to form an annular groove 38 for a purpose later described. Also sleeved on the hub of the driving member and retained between the keys 25—26 and a retaining collar 39 is a camming unit 40 for exerting pressure between the retaining collar and driving pressure ring for moving the driving pressure ring and driven member into clamping engagement with the friction faces of the pressure ring and driving member respectively so as to effect rotation of the driven member by the driving member for applying power of the line shaft through the cable 3.

The retaining collar 39 is mounted on a reduced inner end 41 of the hub of the driving member and is retained in engagement with an annular shoulder 42 by threading of the ring on the reduced portion of the hub as indicated at 43. The retaining collar also has an annular flange 44 to cooperate with the flange 37 in effecting retraction of the driving pressure ring.

Figure 2:
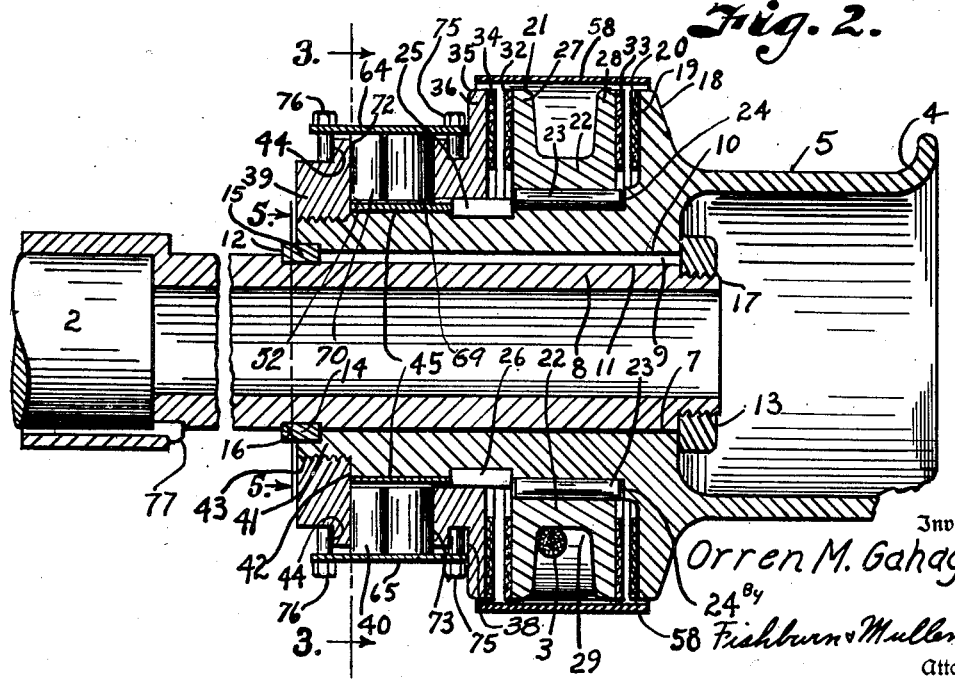
Fig. 2 is a longitudinal section through the apparatus on the line 2—2 of Fig. 1.

The camming mechanism includes a sleeve 45 that is retained on the hub portion of the driving member between the retaining collar and keys 25 and 26 as shown in Fig. 2. Mounted on the sleeve at opposite diametrical sides thereof are arcuate segments 46 and 47 which substantially fill the space between the retaining collar and driving pressure ring when the driving pressure ring is in retracted position as shown in Fig. 1. To lighten the structure of the segments 46 and 47, they preferably include web portions 48 immediately engaging the sleeve 45 and that support flanges 49 which terminate in inwardly extending radial flanges 50 and 51. When the segments are mounted on the sleeve, the radial flanges 50 and 51 on the respective segments are spaced apart as indicated in Fig. 3 to provide diametrically opposed trunnion sockets 52 and 53. The segments are attached to the sleeve 45 by fastening devices such as bolts 54 having heads countersunk in the outer faces of the flanges 49 with shanks extending through radial openings 55 in the segments and into threaded openings 56 in the sleeve as best shown in Fig. 3. The assembly thus far described is retained from rotation through brackets 57 that are attached to the flange portions of the segments and which extend radially to connect with an annular band-like stator 58 which forms a housing about the driven member or sheave as shown in Figs. 1, 2 and 3. The band 58 is provided with an opening 59 for passing the cable 3 therethrough. In order to support the band 58, the band carries a cable guide 60 that is anchored from the derrick floor by means of a post 61. The guide 60 is of cage-like construction and has a roller 62 for guiding the cable 3.

The camming mechanism also includes a yoke-shaped actuator 63 that extends over one of the segments and which has plate-like ends 64 and 65 carrying inwardly disposed trunnions 66 and 67 that engage within the trunnion sockets 52 and 53. In order to provide a camming means for exerting thrust on the driving pressure plate, the trunnions 66 and 67 are provided on opposite diametrical sides thereof with longitudinal connecting grooves 68 and 69 in which are mounted rollers 70 and 71 that are adapted to engage against the facing sides 72 and 73 of the retaining collar and driving pressure ring respectively. The rollers are preferably located so that they roll in contact with each other and the axes thereof are positioned in a common plane extending angularly with respect to the axis of the driving member and the rollers project from the trunnions 66 and 67 a sufficient distance to give a camming action for effecting the desired movement of the driving pressure ring. The yoke also includes an actuating arm or lever 74 that extends laterally therefrom for effecting oscillation of the camming trunnions in the sockets.

In order to assure the retractive movement of the driving pressure ring upon disengagement of the driving connection the plate portions of the yoke are preferably provided in opposite diametric corners with pins 75 and 76 that respectively engage against the outer sides of the flanges 37 and 44 as best shown in Fig. 2.

In assembling the apparatus constructed as described, the bearing 23 is applied to the hub so that it engages the annular stop shoulder 24. The keys 25 and 26 are then applied to retain the bearing in position. The sheave is then applied over the bearing. The driving pressure ring is then applied so that it passes over the keys 25 and 26. The camming unit is assembled by attaching the arcuate members 46 and 47 to the sleeve 45 by means of the bolts 54. The brackets 57 are applied to connect the stator band with the arcuate members and the assembly is moved into position over the threaded end of the hub of the driving member. The yoke carrying the trunnions and camming rollers 70 and 71 is applied by sliding the trunnions into the open sides of the trunnion sockets. The retaining collar is then applied to the hub, after which the pins 75 and 76 are inserted into the plate portions of the yoke.

In applying the assembly on the line shaft 2, the socket end of the shaft extension is sleeved over and secured to the line shaft by suitable means such as a key 77. The split collar 12 is then applied and the hub of the driving member is sleeved over the extension so that the groove 10 receives the key 9. The jam nut 13 is then applied to the outer end of the shaft extension and the cable guide is connected with the post 61 to complete the installation.

In using the apparatus in spinning in threaded joints, the free end of the cable is wrapped about the joint as in conventional practice and the lever 74 of the yoke is moved in a clockwise direction (Fig. 1) to cause the camming rollers 70 and 71 of the trunnions to exert a camming thrust from the retaining collar on the driving pressure ring to move the driving pressure ring into driving engagement with the sheave and the sheave into driving connection with the driving flange of the driving member. The driven member is thus positively clamped between the driving pressure ring and driving flange of the driving member to effect rotation of the sheave under power of the line shaft of the drawworks to cause turning of one member of the joint into the other.

The driving connection between the driving and driven members is readily effected and maintained with relatively light pressures on the shift lever 74 by reason of the pivot being the center of the trunnions and the leverage afforded by the camming rollers 70 and 71. When the spinning in operation is completed the lever 74 is shifted in the opposite direction and the driving pressure ring is retracted through engagement of the pins 75 and 76 with the flanges 37 and 44.

When the device is used in setting up or breaking out threaded joints the device is mounted directly on the outer end of the line shaft. The cable 3 is connected with the tongs as in conventional manner and the sheave is operated in similar manner to apply power to the tongs sufficient to loosen or tighten the joint.

From the foregoing it is obvious that I have provided a simple, quick-acting apparatus that is of compact and durable construction and which is positive in operation. It is also obvious that I have provided an apparatus that is adapted for breaking out, spinning in and setting up threaded joints so that these operations can be effected through a single apparatus for double purposes.

What I claim and desire to secure by Letters Patent is:

1. An apparatus of the character described including a rotary driving member, a driven member, a stator encircling the driven member for supporting cam members, a cable guide on the stator, means supporting the driving and driven members in coaxial relation and for relative axial movement of one of the members to and from the other, means for retaining the other member from axial movement, said members having interengageable friction faces on facing sides thereof, a cable connected with the driven member and extending through said guide, a retaining collar spaced from the axially movable member on the side opposite the fixed member and having fixed support against axial movement with respect to the fixed member, a driving pressure ring having sliding coaxial support between the retaining collar and the axially movable member and having a frictional face adapted to engage a corresponding frictional face of the axially movable member, and cam members carried by the stator and engaging between the retaining collar and driving pressure ring, a yoke connected with the cam members for actuating the cam members to bring said friction faces into engagement for effecting rotation of the driven member by the driving member upon rocking of the yoke.

2. An apparatus of the character described including a rotary driving member, a driven member, means supporting the driving and driven member in coaxial relation and for relative axial movement of one of the members to and from the other, means for retaining said other member from axial movement, said members having interengageable friction faces on facing sides thereof, a retaining collar spaced from the axially movable member on the side opposite the fixed member and having fixed support against axial movement with respect to the fixed member, a driving pressure ring having sliding coaxial support between the retaining collar and the axially movable member and having a frictional face adapted to engage a corresponding frictional face of the axially movable member, a cam mechanism including a yoke, trunnions on the yoke engaging between the retaining collar and driving pressure ring, a stator having circumferentially spaced sockets for receiving the trunnions to support the yoke for rocking movement about the axis of the trunnions, rollers carried by said trunnions to provide cams and adapted to rotate in a plane inclined with respect to the axis of the driving and driven members and having rolling contact with each other and retaining collar and driving pressure ring respectively to bring said friction faces into engagement for effecting rotation of the driven member by the driving member upon rocking movement of the trunnions and rollers by said yoke.

3. An apparatus of the character described including a rotary driving member, a sheave, means supporting the driving member and sheave in coaxial relation and for relative axial movement of the sheave to and from the driving member, said driving member and sheave having interengageable friction faces on facing sides thereof, a retaining collar spaced from the axially movable sheave on the side opposite the driving member and having fixed support against axial movement with respect to the driving member, a driving pressure ring having sliding coaxial support between the retaining collar and the sheave and having a frictional face adapted to engage a corresponding frictional face of the sheave, a cam exerting mechanism including a yoke, trunnions on the yoke engaging between the retaining collar and pressure ring, a stator housing the sheave, means carried by the stator and and having sockets receiving the trunnions to support the yoke for rocking movement about the axis of the trunnions, rollers cooperating with said trunnions to form cams adapted to rotate in an inclined plane with respect to the axis of the driving member and having rolling contact with each other and with said retaining collar and driving pressure ring respectively to bring said friction faces into engagement for effecting rotation of the sheave by the driving members upon rocking movement of the trunnions and rollers by said yoke.

4. An apparatus of the character described including a rotary driving member, a driven member, means supporting the driving and driven members in coaxial relation and for relative axial movement of one of the members to and from the other, means for retaining the other member from axial movement, said members having interengageable friction faces on facing sides thereof, a retaining collar spaced from the axially movable member on the side opposite the fixed member and having fixed support against axial movement with respect to the fixed member, a driving pressure ring having sliding coaxial support between the retaining collar and the axially movable member and having a radial frictional face adapted to engage a corresponding frictional face of the axially movable member, a cam mechanism include a yoke, trunnions on the yoke engaging between the retaining collar and driving pressure ring, a stator, arcuate segments carried by the stator and having spaced apart ends to accommodate the trunnions therebetween in supporting the yoke for rocking movement about the axis of the trunnions, interengaging rollers carried by each of said trunnions cooperating therewith to form cams and having rolling contact with said retaining collar and driving pressure ring respectively to effect shift of the driving pressure ring and axially movable member for bringing said friction faces into engagement and for effecting rotation of the driven members by the driving member upon rocking movement of the trunnions and rollers by said yoke.

5. An apparatus of the character described including a rotary driving member, a driven member, means supporting the driving and driven members in coaxial relation and for relative axial movement of one of the members to and from the other, means for retaining said other member from axial movement, said members having interengageable friction faces on facing sides thereof, a retaining collar spaced from the axially movable member on the side opposite the fixed member and having fixed support against axial movement with respect to the fixed member, a driving pressure ring having sliding coaxial support between the retaining collar and the axially movable member and having a friction face adapted to engage a corresponding friction face of the axially movable member, a camming mechanism including a yoke, trunnions on the yoke engaging between the retaining collar and driving pressure ring, a stator, arcuate members between the retaining collar and driving pressure ring and having ends spaced apart to cooperate with the retaining collar and driving pressure ring in accommodating the trunnions therebetween, means supporting the arcuate members in fixed relation with the stator, rollers carried by said trunnions and adapted to rotate in a plane inclined with respect to the axis of the driving and driven members and having rolling contact with said retaining collar and driving pressure ring respectively to shift the driving pressure ring and axially movable member for bringing said friction faces into engagement to effect rotation of the driven member by the driving member upon rocking movement of the yoke.

6. An apparatus of the character described including a rotary driving member, a driven member, means supporting the driving and driven members in coaxial relation with the driving member free to rotate independently of the driven member, means for retaining one of the members from axial movement, a retaining collar spaced from the other member on the side opposite the fixed member, a driving pressure ring having sliding keyed connection with the driving member and mounted between the retaining collar and said other member and having a frictional face adapted to engage a corresponding frictional face of said other member, a camming mechanism including a yoke, trunnions on the yoke engaging between the retaining collar and driving pressure ring, a stator, arcuate members between the retaining collar and driving pressure ring and having ends spaced apart to cooperate with the retaining collar and driving pressure ring in accommodating the trunnions, means carried by the stator and engaging the trunnions to support the yoke for rocking movement about the axis of the trunnions, rollers carried by said trunnions and adapted to rotate in an inclined plane with respect to the axis of the driving and driven members and having rolling contact with said retaining collar and driving pressure ring respectively to shift the driving pressure ring against the said other member for bringing said friction faces into engagement and for effecting rotation of the driven member by the driving members upon rocking movement of the yoke.

7. An apparatus of the character described, a driving member including a hub portion and an annular radial driving flange circumferentially of the hub portion, a driving pressure ring slidably keyed on the hub portion in spaced relation with said flange, a sheave loosely rotatable on the hub portion between said driving pressure ring and driving flange, a retaining ring fixed on the hub portion and spaced from the driving pressure ring, a camming mechanism including a yoke, trunnions on the yoke engaging between the retaining collar and driving pressure ring, a stator, means carried by the stator and engaging the trunnions to support the yoke for rocking movement about the axis of the trunnions, rollers carried by said trunnions and having rolling contact with said retaining collar and driving pressure ring respectively to shift the driving pressure ring into driving contact with the sheave drum, said driving pressure ring and retaining collar having annular grooves, and pins on the yoke and engageable in said grooves to return the pressure ring upon reverse movement of the yoke.

8. An apparatus of the character described including a rotary driving member having a hub and a radial driving flange, a driven member freely supported on the hub alongside said flange, said driven member and flange having interengageable friction faces on facing sides thereof, a retaining collar spaced from the driven member and fixed on the hub, a driving pressure ring on the hub and having sliding keyed connection therewith between the retaining collar and the driven member and having a friction face adapted to engage a corresponding friction face of the driven member, a sleeve rotatable on the hub portion between the retaining collar and driving pressure ring, a camming mechanism including a yoke, trunnions on the yoke engaging between the retaining collar and driving pressure ring, a stator, arcuate spacing members engaging the sleeve and having ends engaging the trunnions, means on the stator for fixing the arcuate members from rotation, fastening devices extending through the arcuate members and into the sleeve to space the arcuate members on the respective sides of the trunnions, rollers carried by said trunnions and having rolling contact with said retaining collar and driving pressure ring respectively to shift the driving pressure ring for bringing said friction faces into engagement for effecting rotation of the driven member by the driving member upon rocking movement of the yoke on said trunnions.

9. An apparatus of the character described including a rotary driving member having a hub and a radial driving flange, a driven member freely supported on the hub alongside said driving flange, said driven member and driving flange having interengageable friction faces on facing sides thereof, a retaining collar spaced from the driven member and fixed on the hub, a driving pressure ring on the hub and having sliding keyed connection therewith between the retaining collar and the driven member and having a friction face adapted to engage a corresponding friction face of the driven member, a sleeve rotatable on the hub portion between the retaining collar and driving pressure ring, a camming mechanism including a yoke, trunnions on the yoke engaging between the retaining collar and driving pressure ring, a stator, arcuate spacing members engaging the sleeve and having ends engaging the trunnions, means on the stator for fixing the arcuate members from rotation, fastening devices extending through the arcuate members and into the sleeve to space the arcuate members on the respective sides of the trunnions, rollers carried by said trunnions and having rolling contact with said retaining collar and driving pressure ring respectively to shift the driving pressure ring for bringing said friction faces into engagement for effecting rotation of the driven member by the driving members upon rocking movement of the yoke on said trunnions, said retaining collar and driving pressure ring having circumferential grooves, and means on the yoke for engaging said grooves to effect return of the driving pressure ring upon reverse movement of the yoke.

10. An apparatus of the character described, a driving member including a winding drum having a hub portion and an annular radial driving flange circumferentially of the hub portion, a driving pressure ring slidably keyed on the hub portion in spaced relation with said flange, a driven member having radial flanges forming a groove for carrying a cable loosely rotatable and axially movable on a bearing of the hub portion between said driving pressure ring and said flange, a retaining ring fixed on the hub portion and spaced from the driving pressure ring, a cam exerting mechanism including a yoke, means on the yoke for retracting said driving pressure ring, trunnions on the yoke engaging between the retaining collar and driving pressure ring, a stator carrying a guide for said cable, means anchoring the stator against rotation, means carried by the stator and having sockets for engaging the trunnions to support the yoke for rocking movement about the axis of the trunnions, facing rollers carried by said trunnions with faces of said rollers in contact rolling with each other and adapted to rotate on axes located in a plane inclined with respect to the axis of the driving and driven members and having rolling contact with said retaining collar and driving pressure ring respectively to shift the driving pressure ring and driven member for clamping the driven member between the driving pressure ring and said driving flange for effecting rotation of the driven member by rocking movement of the yoke.

11. An apparatus of the character described, a driving member including a winding drum having a hub portion and an annular radial flange circumferentially of the hub portion, a driving pressure ring slidably keyed on the hub portion in spaced relation with said driving flange, a sheave loosely rotatable and axially movable on the hub portion between said driving pressure ring and driving flange and having spaced radial flanges, a retaining ring fixed on the hub portion and spaced from the pressure ring, a cam mechanism including a yoke, trunnions on the yoke engaging between the retaining ring and driving pressure ring, a stator forming a housing for the sheave and having a cable guide, a cable adapted to operate through said guide and wind on the sheave between said radial flanges, means carried by the stator and engaging the trunnions to support the yoke for rocking movement about the axis of the trunnions, pairs of rollers carried by said trunnions forming cams adapted to rotate in contact with each other on axes in a plane inclined with respect to the axis of the driving pressure ring and having rolling contact with said retaining collar and driving pressure ring respectively to shift the driving pressure ring and sheave for clamping the sheave between the driving pressure ring and said driving flange for effecting rotation of the sheave by rocking movement of the cam means by said yoke.

12. An apparatus of the character described, a driving member including a winding drum having a hub portion and an annular radial driving flange circumferentially of the hub portion, a driving pressure ring slidably keyed on the hub portion in spaced relation with said driving flange, an anti-friction bearing on the hub portion, a sheave loosely rotatable on the hub portion between said pressure ring and flange and having spaced radial flanges carrying friction rings, a retaining ring having a radial flange fixed on the hub portion and spaced from the driving pressure ring, a cam mechanism including a yoke, trunnions on the yoke engaging between the retaining collar and driving pressure ring, a stator having a cable guide, means carried by the stator and forming sockets for engaging the trunnions to support the yoke for rocking movement about the axis of the trunnions, rollers carried by said trunnions forming cams and having rolling contact with each other and with said retaining collar and driving pressure ring respectively to shift the driving pressure ring and the sheave toward said driving flange for effecting driving engagement of the sheave upon rocking movement of the cam by said yoke.

ORREN M. GAHAGAN.

REFERENCES CITED

The following references are of record in the file of this patent:

UNITED STATES PATENTS

| Number | Name | Date |
|---|---|---|
| 411,604 | Moore et al. | Sept. 24, 1889 |
| 684,581 | McCollum | Oct. 15, 1901 |
| 2,290,735 | Brauer | July 21, 1942 |
| 2,300,122 | Kelley | Oct. 27, 1942 |
| 2,354,621 | Spase | July 25, 1944 |